United States Patent

[11] 3,634,694

[72] Inventors George K. C. Hardesty
 Mayo;
 Joseph W. Dickey; Donald J. Waltman, Jr.,
 both of Annapolis, all of Md.
[21] Appl. No. 808,209
[22] Filed Mar. 18, 1969
[45] Patented Jan. 11, 1972
[73] Assignee The United States of America as
 represented by the Secretary of the Navy

[54] PROGRAMMED-RESPONSE SPECTRAL
 SCANNING TELEPHOTOMETER SYSTEM
 19 Claims, 3 Drawing Figs.
[52] U.S. Cl................................................. 250/217,
 356/224
[51] Int. Cl................................................ G02f 1/28
[50] Field of Search........................................ 250/214,
 217; 356/100, 235, 224; 351/1, 6

[56] References Cited
 UNITED STATES PATENTS
3,012,467 12/1961 Rosenthal..................... 356/100 X
3,431,054 3/1969 Doonan et al. .............. 356/100
3,437,411 4/1969 Rudomanski et al. ........ 356/100 UX
 OTHER REFERENCES
 Braun, R. J. " Wide-Response Amplifier with Automatic Threshold Control," IBM Technical Disclosure Bulletin, Vol. 8, No. 4 Sept. 1965 pp. 690– 691

Primary Examiner—James W. Lawrence
Assistant Examiner—D. C. Nelms
Attorneys—L. A. Miller, Q. E. Hodges and A. Sopp ABSTRACT: Visible and near visible light is spectrally scanned to produce a detection signal which is combined with another signal representing a correction function so that combination of the signals produce a response function essentially equivalent to that of the human eye for a wide variety of types of sources.

PROGRAMMED-RESPONSE SPECTRAL SCANNING TELEPHOTOMETER SYSTEM

The invention described herein may be manufactured and used by or for the Government of the United States of America for governmental purposes without the payment of any royalties thereon or therefor.

BACKGROUND

Luminous sources such as ionized gas tubes, electroluminescent phosphors, radioactively excited phosphors and electron beam photon-excited phosphor screens have only recently been incorporated in display systems generally, and especially in shipboard display systems. It is important to note that they are all characterized by the fact that their spectral distributions (energy versus wavelength characteristics) are radically different from those of tungsten lamps, which have previously been used in shipboard information display systems. This introduces serious problems in measuring the luminance of these displays, since commercially available photometers employing photosensors are excessively influenced by the spectral distribution of the luminous source which they are measuring. This excessive influence of spectral distribution is inherent in the design of the instruments and results from practical limitations associated with the spectral responses of the photosensors as used in their detection techniques. The accuracy of any instrument which measures the photometric quantity luminance can be expressed in terms of the closeness with which the response of the instrument matches a prescribed function of wavelength and responds to the total luminous energy that it receives from the luminous display or other object that is being evaluated.

SUMMARY

According to the present invention there is provided a photoresponsive arrangement, the response of which can be made to approximate almost any function, including the luminosity and color responses of the human eye, in relation to a large variety of differing light sources. In carrying out the present invention, there are employed suitable mechanical or electrical wavelength scanning and detecting means, whereby the detection of light at any instant is restricted to the energy in a narrow band centered at a particular wavelength. The effective response of the system may be preadjusted at every wavelength in the spectrum and thus make the response characteristic of the system any desired function. This may be done by employing a function generator which is driven by the same signal which controls the wavelength scanning device so that, when the detector is "looking" for radiation of a particular wavelength, the output of the function generator is adjusted to the desired voltage. Under these conditions, when the output of the function generator is combined with e.g. multiplied by the signal from the detector, the product can be any function of wavelength. The choice of the characteristic curve of the system describing the response to a known source will then determine the correction function which is supplied by the function generator to approximate the CIE Standard Observer, i.e. CIE is the Commission Internationale d'Eclairage, universally adopted as the basis for all photometric (luminance, candle power, lumens, etc.) units.

Previously, the building into a photometer of the response of the CIE Standard Observer has been difficult. Existing instruments are inadequate in this respect.

According to the present invention the function generator may be adjusted to make the instrument response completely uniform over the entire spectrum, in which case the same instrument is used as a radiometer capable of reading directly in watts of radiant power per unit of surface area of the luminous source. In other radiometric or photometric or colorimetric applications, the instrument may be arranged to evaluate the energy that it receives relative to a 2,854° K. tungsten lamp (CIE Illuminant A) or relative to daylight (CIE Illuminant C). One instrument may contain several different function generators and thus provide any of the above or other spectral responses as manually or automatically selected modes of operation. As examples, the same instrument may be programmed to successively indicate the luminance, tristimulus (colorimetric) and cone-to-rod ratio (dark-adaptation figure of merit) of a single-visual display. Furthermore, it may be used as a unique photographic exposure meter containing the spectral response functions of any desired black and white, color, infrared or other photographic emulsions. Still further, the instrument may function as the essential subsystem of an industrial product control system wherein such quantities as reflectance and chromaticity (color) are respectively measured and "online" process controls are automatically adjusted to maintain the product between limits.

BRIEF DESCRIPTION OF THE DRAWINGS

Reference is made to the drawings in which.

DETAILED DESCRIPTION AND OPERATION

Figure 1:
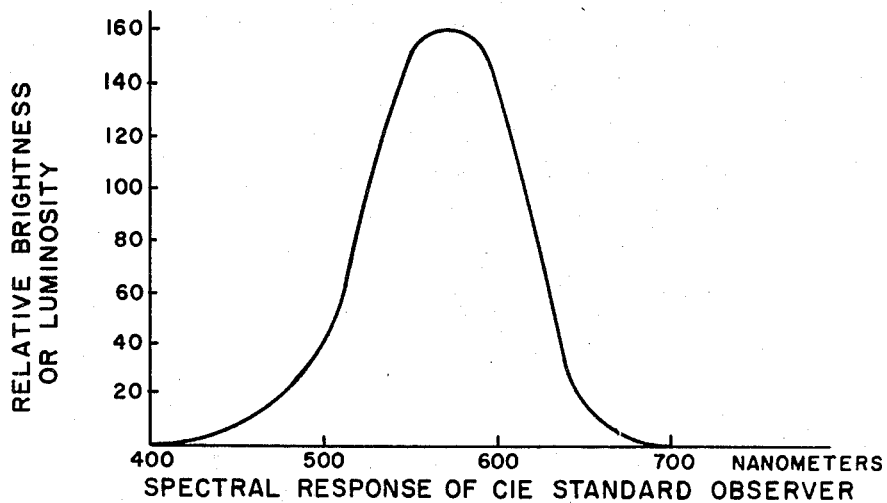
FIG. 1 is an explanatory graph depicting a plot of spectral response of the "Standard Observer," e.g. equal energy versus luminous efficiency.

Referring to FIG. 1, there is shown graphically a standard for the response of the human eye, the Standard Observer. The standard has been adopted from a number of experimental results assembled by the Commission Internationale d'Eclairage (CIE). This standard is a locus of points (FIG. 1) which defines the relative luminous efficiency, $V\lambda$, at every wavelength, $\lambda$ and is in a sense the sensitivity versus wavelength characteristics of the "standard" human eye used as a radiation detector. It is a function which describes the subjective response of the average human when the eye is subjected to equal amounts of radiant energy over the visual range of wavelengths.

The human eye is incapable of dispersing light to analyze its constituent colors (wavelengths). Therefore, even though a subjective color evaluation results from other attributes of the eye, the effect of a source's spectral distribution on the human eye must be an integral quantity not rendering analytical information of the spectral energy distribution of the source. Hence, the total visual (photometric) sensation due to a source of spectral distribution $P(\lambda)$ is proportional to the integral of the product of the source's spectral distribution and the relative luminance or luminous efficiency, $\bar{v}$.

Figure 2:
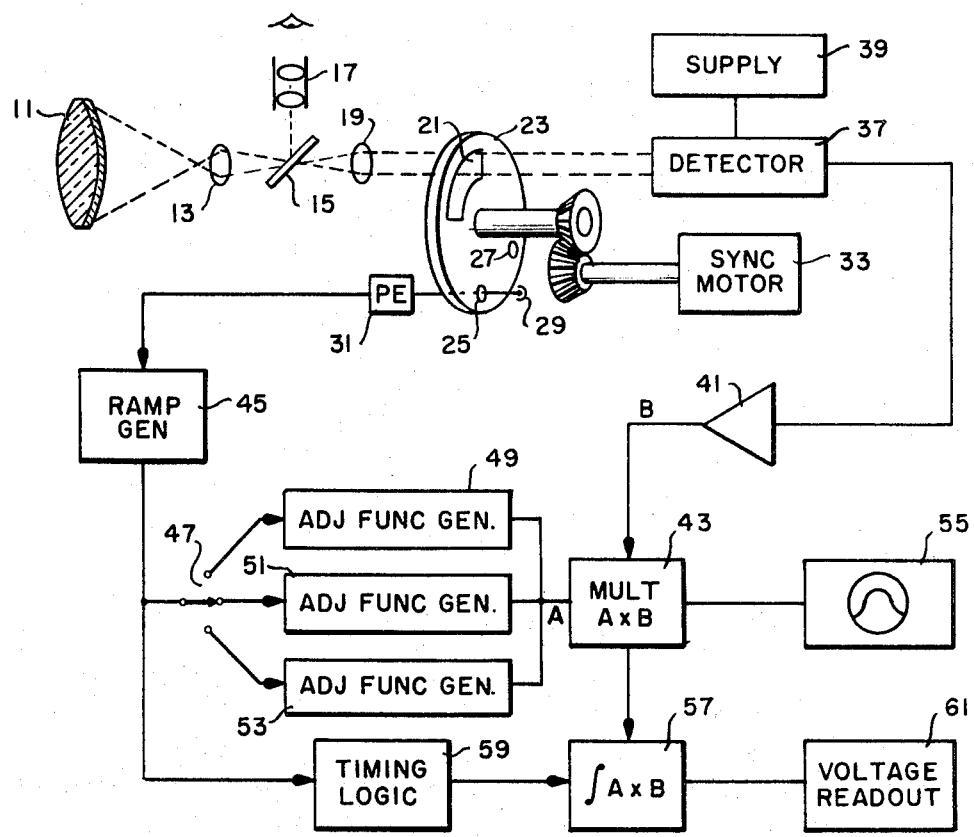
FIGS. 2 and 3 are views of respective embodiments of the invention in schematic block diagram form.

Reference is now made to FIG. 2 which shows a spectrum scanning arrangement providing predetermined spectral response characteristics for any of a broad range of sources of spectral distributions. The visible or near visible radiant energy to be analyzed is collected by an achromatic objective lens 11 which defines the entrance aperture of the system. As indicated by the broken lines representing rays, the collected energy falls upon a first auxiliary lens 13 passing the rays to focus at a mirror 15 so that part of the energy is passed to a conventional viewing eyepiece 17. The mirror 15 has an aperture therein so that radiant energy is passed therethru to a second auxiliary lens 19. The narrow beam passing thru lens 19 is nearly parallel and of small cross section as it reaches a monochromater 21 (i.e. variable band pass optical filter commonly known as an "interference wedge") configured as a sector of a rotatable disc 23.

The interference wedge 21 is a commercially available flat prism having an overall pass band of from about 360 to about 760 namometers and has the property within that band of passing from a light beam impinging thereon a very narrow band of light, i.e. essentially monochromatic light. Thus, as the disc 23 rotates, the wedge 21 continuingly passes essentially monochromatic light of wavelength varying with disc movement.

A pair of spaced-apart apertures 25, 27 are located near the periphery of the disc 23 and coact with a light source 29 and a photoelectric pickup 31 to provide first and second pulses defining the duration or time frame of wedge filtering. Of course, any other suitable means such as mechanical or magnetic pickups may be used to provide the timing function.

The disc 23 is driven via suitable gears, if desired, by a sync motor 33. The light or near visible radiation passed by the wedge 21 is detected by a photomultiplier or other suitable detection means 37 itself supplied and sensitivity gain-controlled in any suitable well-known manner by means of supply 39. The output of the detecter 37 is a signal corresponding to the source and response characteristics of the detector itself, as gain adjusted, and such signal is fed via a preamplifier 41 as signal B to a multiplier 43 of any suitable design, e.g. a Hall multiplier.

Pulses from PE 31 are fed to a voltage ramp generator 45 of any suitable well known design, the first pulse initiating the ramp and the second pulse terminating the ramp. The ramp voltage is fed via a rotary selector switch 47 to one of a plurality of adjustable function generators, 49, 51, 53. The output of a selected one of the function generators is fed to the multiplier 43.

Each of the adjustable function generators may be of construction similar or identical to the others and may be of any suitable well known design. For example, each of the function generators may be composed of plurality of parallel branches each having a diode and a variable resistor in series. Each diode may be reverse biased to a desired voltage level for switching to a conducting state when a forward voltage of this level is applied to the input. The branches may then be summed into an operational amplifier, and as each branch is switched on by the ramp voltage, different voltage slopes are produced at the output of the operational amplifier. The function generator may be arranged so that there are parallel branches, one branch producing positive slopes and the other, negative slopes.

According to the invention, each selected function generator is adjusted to produce a correction curve or signal A, which, when multiplied by signal B, produces on an oscilloscope 55 a curve duplicating that of FIG. 1, or some other curve representing, for example, tristimulus (colormetric) functions, the cone-to-red ratio (dark adaptation figure of merit), etc. The provision of a plurality of function generators enables each of the several generators to be adjusted for a particular correction function A different from the others so that selection thereof by switch 47 produces one of the various correction functions which can be multiplied and observed in device 55.

In certain instances it may be desirable to produce a value (i.e. "number") corresponding to the multiplier signal, which value can be used as a monitoring signal. To carry out this purpose, an integrator 57 of any suitable well-known design receives the multiplier output as one input and a timing signal from a timing logic control circuit 59 to thus produce a voltage readout in readout device 61. More specifically, in connection with certain AC light sources, it is desirable that the multiplier output be integrated for several scan periods to compensate for modulation of the signal on the photomultiplier anode. The timing signals for integration may be produced by the circuit 59 from the ramp voltage by generating a pulse at the start of each ramp and scaling down by any suitable factor (e.g. 8, 10, etc.) so that several successive outputs of the multiplier 43 are averaged in the integrator 57.

Figure 3:
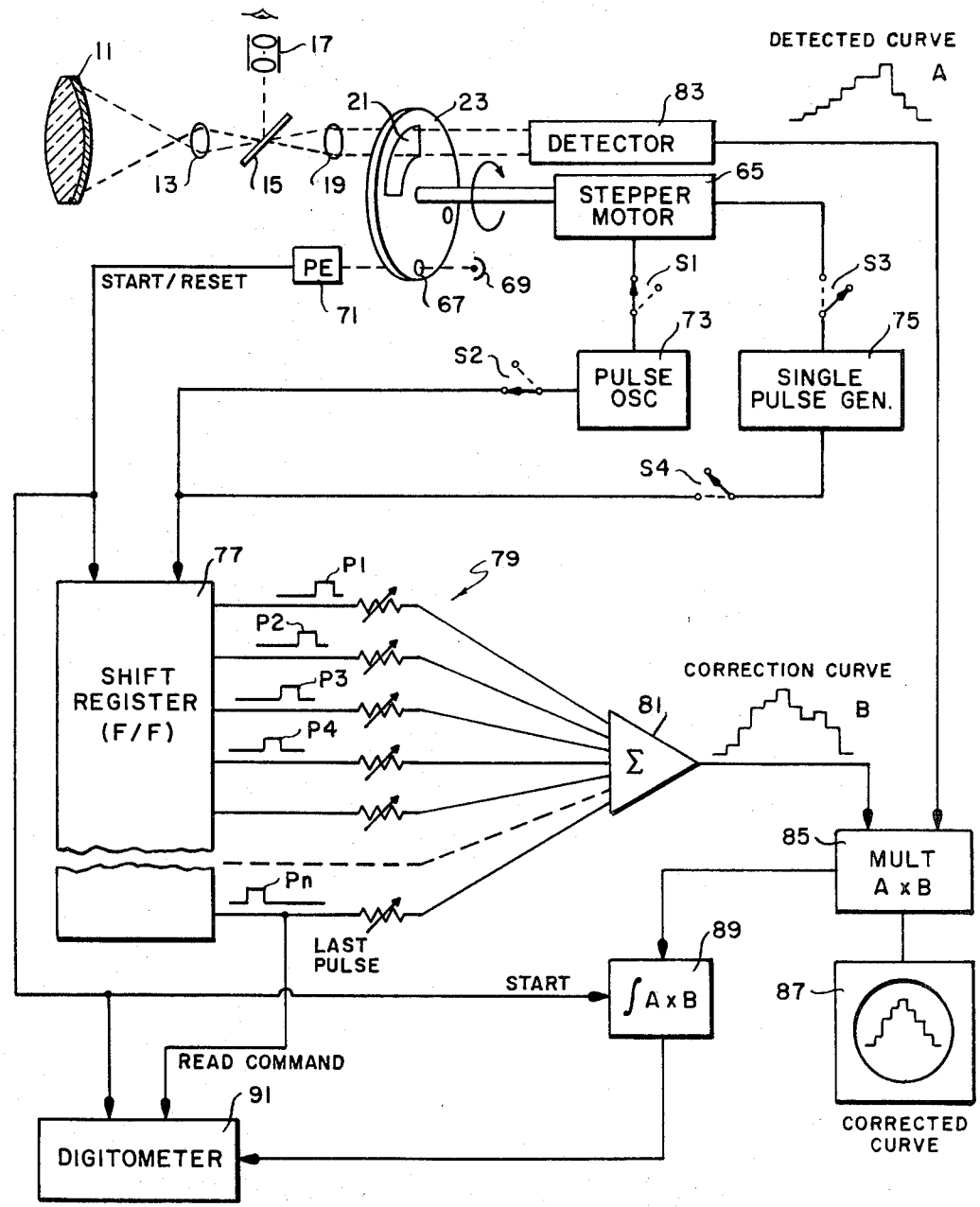

Reference is now made to FIG. 3 which shows a pulse operated version of the FIG. 2 arrangement. The optics of the FIG. 3 arrangement may be the same as that shown in FIG. 2, as indicated by the similar reference numerals. The disc 23 in FIG. 3 is driven by a conventional stepper motor 65, the disc having one aperture 67 near its periphery for coacting with a light source 69 and PE cell 71 to produce a single timing pulse at the start of traverse of wedge 21 across the incoming light beam.

The stepper motor 65 may be driven by either of two sources—pulse oscillator 73 or manually operated single pulse generator 75. Switches $S_1$, $S_2$, $S_3$ and $S_4$ are in the circuit-defining solid line positions when stepper motor 65 is operated by the pulse oscillator 73, said switches occupying the broken line positions during single pulse operation.

The pulse from PE cell 71 enables the start operation of a flip/flop shift register 77 of any suitable well known construction, said shift register producing a plurality of channel-defining, successively delayed pulse outputs $P_1, P_2, \ldots P_n$, one pulse output for each successive position of the wedge and for each successive channel or branch of a function generator 79. The function generator 79 may be of essentially the same construction as each of those of FIG. 2, the variable resistors and operational amplifier 81 of the function generator being generally indicated for purposes of illustration. The variable resistances in each branch or channel of the function generator 79 are adjusted so that a correction curve or signal B is produced at the output of the operational amplifier.

The light beam passing thru the wedge 21 is detected in a photomultiplier detector 83 and fed as signal A to a multiplier 85 which in turn multiplies the A and B signals to provide at oscilloscope 87 the indicated corrected curve or signal comprised of discrete step portions of the combined input waves A and B. The A signal is a series of discrete steps because of the stepped operation of the disc 23 and its wedge 21 under control of pulses from oscillator 73 driving the motor 65.

Of particular advantage in the FIG. 3 arrangement is the manually operable single-step action of the stepper motor and wedge under control of single-pulse generator 75 enabling detailed study of each discrete energy portion of the input spectrum. Very accurate calibration and adjustment of the function generator to produce the desired output on device 87 is enabled because each discrete detected portion of the energy spectrum can be corrected to produce the desired corrected curve or signal. Because each pulse position in the branches of the function generator corresponds to a position of the wedge, each step of the detected input spectrum A and of the correction curve B can be observed, and appropriate adjustments made in each branch of the generator 79.

The output of the multiplier 85 may be integrated in an integrator 89 of any suitable well-known design, said integrator being time controlled by the pulse from PE 71. The integrator output may be fed to a suitable readout device such as a digitometer 91 which is gated to read by the pulse from PE 71 and the last channel pulse of shift register 77.

In carrying out the invention, it is thus understood that the correction curve or signal provided by the function generator may be precalibrated to coact, via multipliers 43 and 89, with the response signal peculiar to a particular detector means to provide a curve or signal which is equivalent to a desired response, say, that of the human eye (e.g. CIE Standard Observer) in relation to any predetermined parameters such as luminance, chromaticity, tristimulus coefficients, etc. Once the precalibration adjustments have been made, the system of the invention may be employed with any source, the outputs of the system automatically producing selected responses related to, say, the human eye and/or other appropriate standards, and not solely dependent on the source despite the detector means employed. Obviously, the system outputs may be employed as signals for monitoring assembly line products and controlling manufacturing steps (e.g. as a radiometer, colorometer, photometer, etc.).

Obviously many modifications and variations of the present invention are possible in the light of the above teachings. It is therefore to be understood that within the scope of the appended claims the invention may be practiced otherwise than as specifically described.

What is claimed is:

1. A system for displaying the response of a light sensor, having a determinable light responsive characteristic, to a spectrum of light energy comprising:

a first means for periodically filtering a spectrum of light and producing time separated discrete bands of essentially monochromatic light, within the filtering period;

second means for producing corresponding and discrete signal amplitudes in response to the discrete light bands produced by said first means;

third means for generating at least one signal functionally related in time to the light bands produced by said first means;

fourth means responsive to the signal produced by said third means for producing a discrete signal amplitude concurrently with each discrete band of essentially monochromatic light produced by said first means, each said discrete signal amplitude being a function of the sensitivity of a light sensor to the essentially monochromatic light concurrently produced; and Fifth means connected to receive the signal of said second means and the signal of said fourth means for producing a display signal amplitude functionally related to the signal amplitudes produced by said second means and the signal amplitudes produced by said fourth means, said display signal amplitude being the response of a light sensor having a determinable light responsive characteristic.

2. The system according to claim 1 wherein said fourth means comprises a plurality of adjustable function generators and switch means for selecting one of said adjustable function generators.

3. The system according to claim 1 wherein said fifth means comprises multiplier means.

4. The system of claim 1 further including an integrating means connected to receive said display signal and integrating the amplitude of said display signal over a plurality of successive periods of said first means to produce a digital value.

5. The system according to claim 1 wherein said first means comprises:
optical filter means for spectrally scanning light from the source; and
said second means includes a photodetector oriented to receive light energy passed by said optical filter means.

6. The system according to claim 5 wherein said optical filter means comprises:
a movable member;
an interference wedge mounted on a portion of said member; and
motive means for driving said movable member, whereby the interference wedge scans the light from the source.

7. The system according to claim 6 wherein said motive means comprises:
a stepper motor causing the output of said first means to be a step wave;
said system further comprising pulse-producing means for driving said stepper motor; and
pulse distributing means coupled to said pulse producing means and to said third means for enabling said third means to produce a quantized pulse for each position of the stepper motor corresponding to a position of the interference wedge.

8. The system according to claim 7 wherein said pulse producing means comprises a pulse oscillator.

9. The system according to claim 7 wherein said pulse producing means comprises a manually operable single pulse generator.

10. The system according to claim 7 including integrator means connected to receive said display signal and integrating the amplitude of said display signal over a plurality of successive periods of said first means.

11. The system according to claim 10 including digital readout means coupled to said pulse distribution means and to said integrator means.

12. A system for displaying a light sensor response function, including that of the human eye, to a large variety of types of light source of different spectral energy distribution characteristics comprising:
optical means defining light from the source into a narrow beam;
movable means including a monochromator mounted thereon for receiving the light beam and via its movement for spectrally scanning the beam;
photoelectric detector means responsive to light energy passed by said monochromator for producing an output signal related to the spectral energy distribution of the light from the source;
said detector output signal also being determined by the characteristics of the detector means;
adjustable function generator means coupled to said movable means for producing in synchronization therewith another signal having an amplitude functionally related to the sensitivity of a light sensor to the light energy passed;
multiplier means for combining both said signals to produce a display signal having an amplitude indicative of a light sensor response; and
indicator means enabling observation of the multiplier output and further adjustment of said adjustable function generator means to produce a desired response function.

13. The system according to claim 12 wherein said movable means comprises a disc driven by a synchronous motor.

14. The system according to claim 13 wherein said movable means comprises a disc driven by a stepper motor; and
said adjustable function generator includes pulse distribution means,
whereby for each center wavelength of the scanned spectrum there is produced by the multiplier a quantized signal value enabling establishment of the predetermined response therefor.

15. A method for ascertaining the response of a light sensor having a determinable light responsive characteristic, to a spectrum of light energy comprising the steps of:
periodically filtering the light spectrum to produce discrete bands of essentially monochromatic light with each discrete band appearing within a discrete interval of the filtering period;
sensing the energy of each discrete band and producing a separate signal amplitude indicative of the energy in each discrete band;
generating a discrete signal amplitude concurrently with each monochromatic band, functionally related to the sensitivity of a light sensor to the monochromatic light; and
combining the signal indicative of the energy sensed in each discrete bandwidth with the signal amplitude functionally related to the sensitivity of the light sensor to produce a display signal functionally related to the response of a light sensor to the spectrum of light.

16. The method according to claim 15 including the step of integrating the display signal amplitude over a plurality of successive periods of the filter.

17. The method according to claim 15 wherein the step of periodically filtering the light spectrum includes the steps of:
driving an interference wedge in the path of the light energy.

18. The method according to claim 15 wherein said step of periodically filtering the light spectrum includes the step by step driving of an interference wedge in the path of the light energy to produce a quantitized pulse for each said step; and
said step of generating the discrete signal amplitude includes the step of generating a discrete pulse concurrently with each quantitized pulse produced, said discrete pulse being functionally related to the sensitivity of the light sensor to the monochromatic light.

19. The method according to claim 17 wherein said step of combining the signal indicative or the energy sensed in each discrete bandwidth with the signal amplitude functionally related to the sensitivity of the light sensor includes the step of producing a step response display signal functionally related to the response of a light sensor to the spectrum of light with each step in the step display signal corresponding to a step position of the interference switch.

* * * * *